United States Patent
Buban

(10) Patent No.: US 11,281,396 B2
(45) Date of Patent: Mar. 22, 2022

(54) STORAGE SYSTEM WITH A PARTIAL REPLICA

(71) Applicant: MICROSOFT TECHNOLOGY LICENSING, LLC, Redmond, WA (US)

(72) Inventor: Garret Buban, Carnation, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 42 days.

(21) Appl. No.: 16/579,484

(22) Filed: Sep. 23, 2019

(65) Prior Publication Data

US 2021/0089228 A1 Mar. 25, 2021

(51) Int. Cl.
*G06F 3/06* (2006.01)
*G06F 9/30* (2018.01)
*G06F 11/10* (2006.01)

(52) U.S. Cl.
CPC .......... *G06F 3/0655* (2013.01); *G06F 3/0604* (2013.01); *G06F 3/067* (2013.01); *G06F 9/30076* (2013.01); *G06F 11/1092* (2013.01)

(58) Field of Classification Search
CPC ...... G06F 3/0655; G06F 3/067; G06F 3/0604; G06F 9/30076; G06F 11/1092
See application file for complete search history.

(56) References Cited

U.S. PATENT DOCUMENTS

| | | | |
|---|---|---|---|
| 7,774,469 B2 | 8/2010 | Massa et al. | |
| 8,326,801 B2 | 12/2012 | Shah et al. | |
| 9,690,679 B2 | 6/2017 | Shah et al. | |
| 2003/0204534 A1* | 10/2003 | Hopeman | G06F 16/284 |
| 2007/0239751 A1* | 10/2007 | Wei | G06F 16/2379 |
| 2014/0164329 A1 | 6/2014 | Guo et al. | |
| 2014/0195480 A1* | 7/2014 | Talagala | G06F 16/2365 707/610 |
| 2018/0165343 A1 | 6/2018 | Fan et al. | |

(Continued)

OTHER PUBLICATIONS

"How is the consistency level configured?", Retrieved from: https://web.archive.org/web/20151208012023/https:/docs.datastax.com/en/cassandra/3.0/cassandra/dml/dmlConfigConsistency.html, Dec. 8, 2015, 3 Pages.

(Continued)

*Primary Examiner* — Hiep T Nguyen
(74) *Attorney, Agent, or Firm* — Shook, Hardy & Bacon L.L.P.

(57) ABSTRACT

Methods, systems, and computer storage media for providing temporary storage for data that has to be durably stored based on a replica set that includes a partial replica and a set of full replicas in a distributed computing environment. The partial replica of the replica set temporarily and durably stores data but does not persist the data when the set of full replicas have communicated a promise response to store the data. In operation, instructions to communicate promise responses are communicated to a replica set comprising a partial replica and a set of full replicas. A promise response indicates that a replica in the replica set will commit the data block of the write request. Promise responses are received from the set of full replicas. Based on receiving promise responses from the set of full replicas, a forget instruction is communicated to the partial replica to forget the data block.

20 Claims, 7 Drawing Sheets

(56) References Cited

U.S. PATENT DOCUMENTS

2019/0012100 A1     1/2019   Sharma et al.
2019/0340011 A1*   11/2019   Raman ................ G06F 16/2365

OTHER PUBLICATIONS

Murat, "Paper Review: Probabilistically Bounded Staleness for Practical Partial Quorums", Retrieved From http://muratbuffalo.blogspot.com/2019/01/paper-review-probabilistically-bounded.html, Jan. 29, 2019, 7 Pages.

* cited by examiner

STORAGE SYSTEM WITH A PARTIAL REPLICA

BACKGROUND

Users often rely on computing resources (such as applications and services) to perform various computing tasks. Distributed computing environments can support building, deploying, and managing applications and services. Users and enterprises are moving away from traditional computing environments to run their applications and services on distributed computing environments. Distributed computing environments implement durable storage mechanisms (e.g., durable storage management for block store or blob storage) to ensure the storing data for different types of disk workloads in the distributed computing environments. As distributed computing environments increasingly support applications and services, it is necessary to improve systems for providing both storage functionality and data durability in distributed computing environments.

SUMMARY

Various aspects of the technology described herein are generally directed to systems, methods, and computer storage media, for among other things, providing temporary storage for data that has to be durably stored based on a replica set that includes a partial replica and a set of full replicas in a distributed computing environment ("computing environment"). In particular, the partial replica of the replica set (e.g., a replica that is a storage entity for processing copies of data blocks) temporarily and durably stores data but does not persist the data when the set of full replicas have communicated promise responses for the data (i.e., intent to make a change based on a write request). The replica set and a change coordinator are part of implementing a replication logic (e.g., quorum-based replication logic) for durably storing data to meet multiple specified storage objectives (or configurations) for the storage system. The operations of the replica set ("replica set operations") help meet the storage objectives (including storage objectives based on: loss of a replica, degraded performance of a replica, storage efficiency, and a predefined number of durable copies) of the storage system. Additionally, the storage system can specifically be an update in-place storage system. In this regard, the storage system supports durability and latency objectives in the computing environment based on continuously (without conventional interruptions) performing replica set operations, while having in-place reads and writes for disk space workloads.

By way of background, in distributed computing environments, in order to ensure durability storage mechanism, durable storage functionality is implemented based on storing a predetermined number of copies of the data (e.g., three copies). Storage systems have to balance risk of data loss with consuming excess storage resources. For example, implementing any less than three copies may cause loss of data and storing more than three copies may overuse storage. Depending on the priorities of any given system, storage objectives can be configured differently. For larger storage systems, it is common to keep three copies of mutable data. For smaller, high-performance systems, it is common practice to use a quorum-based storage system with at least three durable copies.

Conventional storage systems that provide durable storage are limited in their capacity to efficiently meet a combined set of storage requirements (including storage objectives based on: loss of a replica, degraded performance of a replica, storage efficiency, and a predefined number of durable copies). Several conventional implementations of storage systems may meet some of the storage objectives; however, based on the specific storage offering type, the storage system may lack one or more of the storage objectives. Moreover, a design framework of the storage system (e.g., append-only with garbage collection) may inherently cause the storage objectives to be developed and implemented without consideration for the complete set of storage objectives identified above. As such, an alternative approach for providing a storage system that can provide a set of objectives around durability and latency in computing environments would improve computing operations in storage systems.

Aspects of the technical solution described in the present disclosure are directed towards improving the limited capacity of conventional systems to meet a combined set of storage requirements (including storage objectives based on: loss of a replica, degraded performance of a replica, storage efficiency, and a predefined number of durable copies) by providing temporary storage for data that has to be durably stored based on a replica set that includes a partial replica and a set of full replicas in a computing environment. In particular, the partial replica of the replica set temporarily and durably stores data but does not persist the data when the set of full replicas have communicated promise responses for the data.

In operation, a change coordinator processes a write request (for data) from a client. The change coordinator can assign the write request a sequence number. The change coordinator communicates instructions to a replica set (i.e., a partial replica and a full replica set) requesting promises responses for the data (i.e., a guarantee from each replica in the replica set that the data can be committed at the replica). When the change coordinator receives promise responses from the set of full replicas, the change coordinator communicates instructions to the partial replica to forget the data. The change coordinator can also increase a forget sequence number associated with the partial replica.

The change coordinator can also be configured to receive promise responses from a quorum of the replica set. Based on receiving the promise responses, the change coordinator can increase a commit sequence number and communicate a write acknowledgement to the client. The change coordinator communicates instructions to the replica set to commit the data. Based on having the replica set with both a partial replica and a set of full replica, a storage system can tolerate a loss of a replica, degraded performance of a replica, storage efficiency, and a predefined number of durable copies In this way, the replica set can continuously perform replication operations, while having in-place reads and writes for disk space workloads. Additional aspects of the technical solution (e.g., failure conditions logic, rebuild logic) are described below, by way of example implementations, with reference to technical solution environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
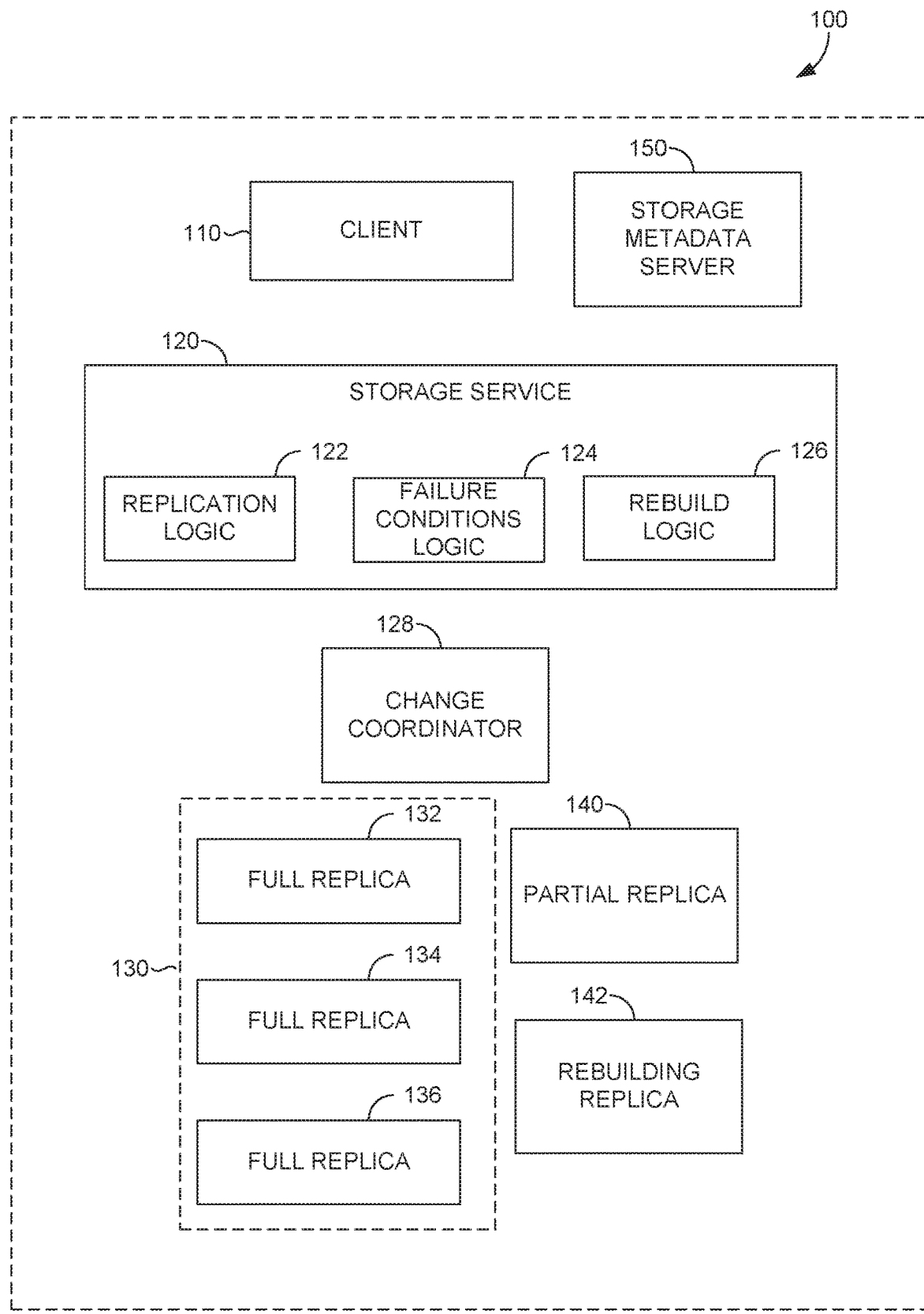
FIG. 1 is a block diagram of an example storage system environment for providing partial replica operations using a partial replica, suitable for use in implementing aspects of the technology described herein.

Overview of Aspects of the Technical Problem, Technical Solution, and Technological Improvement Distributed computing environments implement durable storage mechanisms (e.g., durable storage management for block storage or blob storage) to ensure the storing data for different types of disk workloads in the distributed computing environments. Durability can generally refer to long-term data protection, where the stored data does not suffer from bit rot, degradation or other corruption. Rather than focusing on hardware redundancy, it is concerned with data redundancy so that data is never lost or compromised. For example, the data is not stored in RAM, it is stored in a power-resistant storage.

In distributed computing environments, in order to ensure durability storage mechanism, durable storage functionality is implemented based on storing a predetermined number of copies of the data (e.g., three copies). Storage systems have to balance risk of data loss with consuming excess storage resources. For example, implementing any less than three copies may cause loss of data and storing more than three copies may overuse storage. Depending on the priorities of any given system, storage objectives can be configured differently. For larger storage systems, it is common to keep three copies of mutable data. For smaller, high-performance systems, it is common practice to use a quorum-based storage system with at least three durable copies.

Conventional storage systems that provide durable storage are limited in their capacity to efficiently meet a combined set of storage requirements (including storage objectives based on: loss of a replica, degraded performance of a replica, storage efficiency, and a predefined number of durable copies). Several conventional implementations of storage systems may meet some of the storage objectives; however, based on the specific storage offering type, the storage system may intentionally disregard one or more of the storage objectives.

Moreover, a design framework of the storage system (e.g., append-only with garbage collection) may inherently cause the storage requirements to be developed and implemented without consideration for the set of storage objectives identified above. For example, a conventional storage system can be built on an append-only garbage collection framework, where data is stored by appending the data to existing data (i.e., data is written to a new location) and garbage collection is used for memory management. However, the overhead associated with garbage collection can be significant (e.g., garbage collection operations impacting other resources such as networking and CPU) and read latencies can but higher in append-only systems because reads are likely not to be contiguous. As such, an alternative approach for providing a storage system that can provide a set specified set of objectives around durability and latency in computing environments would improve computing operations in storage systems.

Embodiments of the present invention are directed to simple and efficient methods, systems, and computer storage media for providing temporary storage for data that has to be durably stored based on a replica set that includes a partial replica and a set of full replicas in a computing environment. In particular, the partial replica of the replica set temporarily and durably stores data but does not persist the data when the set of full replicas have communicated promise responses for the data. The replica set and a change coordinator implement a replication logic for durably storing data to meet multiple a specified storage objectives (or configuration) for the storage system. The operations of the replica set help meet the storage objectives (including storage objectives based on: loss of a replica, degraded performance of a replica, storage efficiency, and a predefined number of durable copies) of the storage system. Additionally, the storage system can specifically be an update in-place storage system. In this regard, the storage system supports durability and latency objectives in a distributed computing system based on continuously (without conventional interruptions) performing replica set operations, while having in-place reads and writes for disk space workloads.

Overview of Example Environments for Providing a Storage System

Figure 2:
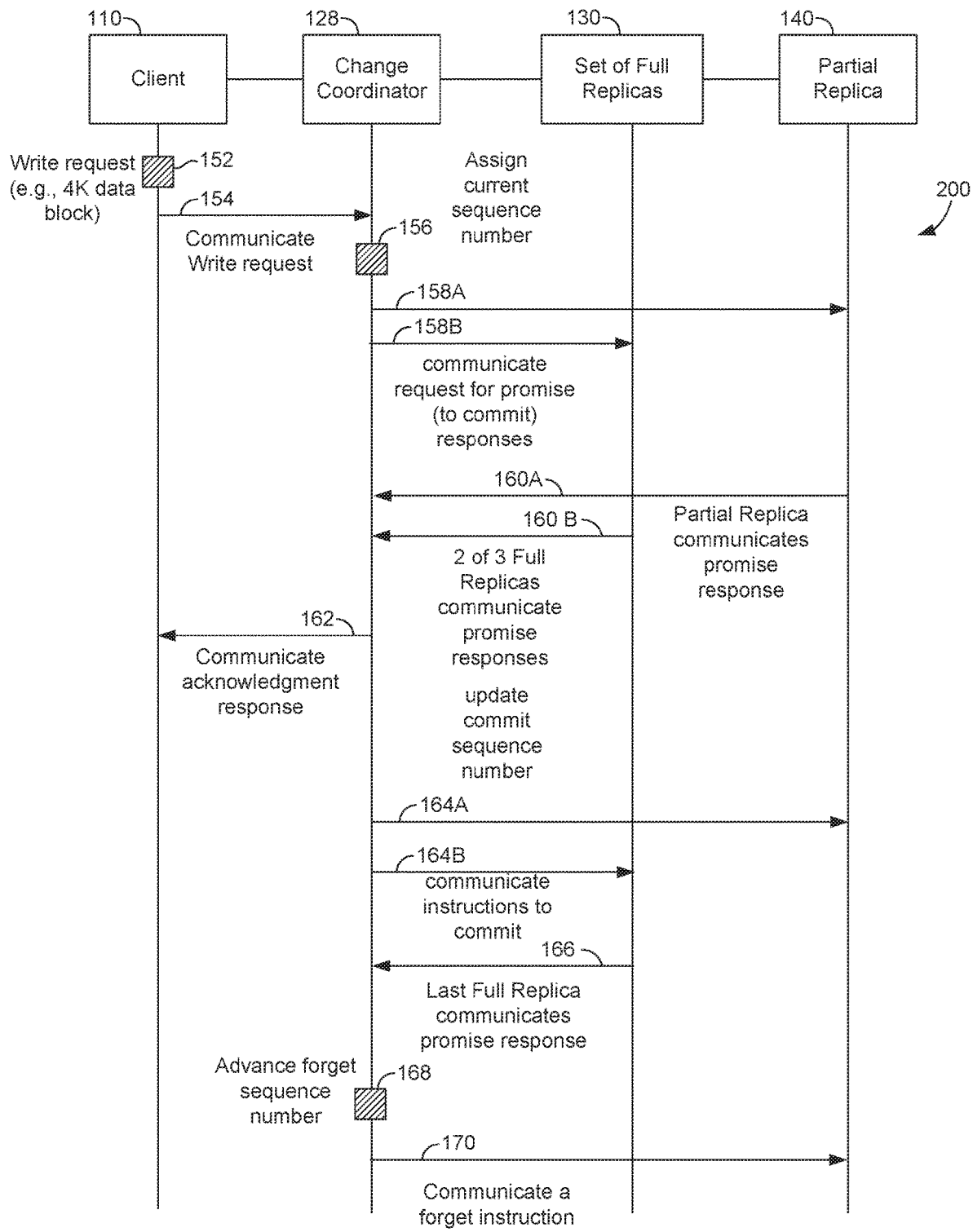
FIG. 2 is an example storage system environment for providing replica set operations in accordance with aspects of the technology described herein.

Aspects of the technical solution can be described by way of examples and with reference to FIG. 1 and FIG. 2. With initial reference to FIG. 1, FIG. 1 discloses storage system environment (storage system 100) including a client 110, storage service 120 (with replication logic 122, failure conditions logic 124, and rebuild logic 126), change coordinator 128, a full replica set 130 (with full replica 132, full replica 134, and full replica 136), and partial replica 140, and storage metadata server 150. The storage system 100 can have corresponding features and functionality as storage system 600 described herein with reference to FIG. 6.

At a high level, in order to meet durability and latency objectives, a storage system uses a replica set (e.g., four replicas with a write quorum of three). To reduce storage usage, the storage system (i.e., storage system 100) uses a replication mechanism with asymmetric replicas. As illustrated, the storage system includes the three full replicas ("set of full replicas" 130—i.e., full replica 132, full replica 134, and full replica 136), a partial replica (i.e., partial replica 140), and the change coordinator 128 (operating as a change coordinator). The partial replica durably commits changes but does not persist them when the other replicas have acknowledged the write. When the partial replica is informed that the set of full replicas have the data promised, the partial replica can forget about the change. The storage system can allow for a configurable number of replicas and a configurable requirement for a write quorum.

The storage system is responsible for supporting the replica set operations described herein based on specific nodes having roles associated with the replication logic (e.g., replication logic 126). The replication logic can include a replication protocol based on sequence numbers and rules for communicating between nodes. For example, a full replica can contain all the data of a segment of a disk (e.g., a slice), a partial replica can contain only the data that have not been promised by all full replicas. A rebuilding replica can contain part of the data as the rebuilding replica is copying the rest of the data from a full replica. The change coordinator can operate as a change coordinator to handle requests that change the state of data of a slice. The change coordinator can be collocated with a replica.

The replication logic can be based on several defined terms for referring to entities or operations of the replication logic. The terms include the following: a log sequence number (LSN) that refers a value (e.g., monotonically increase value) that identifies a change, an epoch that represents a streams of LSNs. For example, in order to invalidate all LSNs of a given value and higher, the epoch must advance and the stream of LSNs must be "sealed" at the last valid LSN. This can be in reaction to one or more errors. The metadata version can represent the state of the metadata for a slice. In particular, if the metadata changes, the version is incremented. For example, if the set of replicas changes, this number can be advance. Optionally, the metadata value can be reset to zero whenever the epoch is advanced. A promise (e.g., promise response) can refer to when a replica agrees to make a change, a commit (e.g., commit instruction) can refer to when a replica is instructed to make a change. An acknowledgment can refer to a communication that a change has been completed.

The replication logic can further include specific types of sequence numbers. For example, the current LSN can refer to the LSN for the change in a given context. In particular, for a write, the current LSN is assigned to the write, and for a read it is the minimum LSN required to satisfy the read. A commit LSN can refer to the highest LSN that has been promised by a quorum of replicas. The LSN can be returned to the client when acknowledging a write. A forget LSN can refer to the highest LSN that has been promised by all full replicas. The value can be used by a partial replica to determine when to stop storing the data for a given change. The promise LSN can refer to the highest LSN that a replica has promised it can commit.

The replication logic also includes rules that indicate how the replication set operations are performed. For example, a replica will promise changes in order. When a replica promises at least an LSN, the replica is promising the LSN and all LSNs below the promised LSN. In this way, the replica cannot be missing any changes, and for a full replica, the full replica can contain all data for all snapshots and all data for all changes up to and including the change with the LSN being promised. For a partial replica, the partial replica can contain all data for all changes with an LSN from one greater than the forget LSN up to and including the change with the LSN being promised. The change coordinator operating as a change coordinator cannot advance the commit LSN until the LSN has been promised by a write quorum of the replica set. The change coordinator cannot acknowledge a change until the commit LSN reaches the LSN for that change. The store manager cannot advance the LSN until the LSN and all lower LSNs have been promised by the set of full replicas.

With reference to FIG. 2, FIG. 2 also discloses a storage system (i.e., storage system 200) that supports the functionality of the technical solution. The storage system can have corresponding features and functionality as storage system 100 described herein with reference to FIG. 1. At a high level, by way of example, during normal operations, requests from the client can include the current epoch, metadata version, and highest LSN the client has seen. Responses to the client include the current epoch, metadata version, and the commit LSN. Requests from the change coordinator to the replicas include the current epoch, current LSN, commit LSN, and forget LSN.

With reference to a write request, a client transmits (i.e., client 110) a write request to the change coordinator (i.e., change coordinator 128). The change coordinator assigns this write an LSN and replicates the write to all replicas in the quorum. Each replica promises to make this write. When the change coordinator receives promises from a write quorum of replicas, the change coordinator advances the commit LSN and acknowledges the write to the client. The change coordinator transmits the commit LSN to all replicas. This can be piggybacked onto a subsequent request or sent on its own, if there is no subsequent request. Asynchronously, the change coordinator waits for the set of full replicas (i.e., set of full replicas 130) to promise the change. Once all full replicas have promised, the change coordinator advances a forget LSN associated with the partial replica. The change coordinator transmits the forget LSN to the partial replica. This can be piggybacked onto a subsequent request or sent on its own, if there is no subsequent request. The forget/commit messages can also be merged into one request message. The following is a sequence for a write which was quorum committed using the partial replica as one of the three promises used to acknowledge the write.

As shown in FIG. 2, initially at step 152, the client 110 communicates 154 a write request to the change coordinator 128, where the write request is associated with a data block to cause change to data stored in the storage system 200. The change coordinator 128, at step 156, can assign a sequence number to the write request. At steps 158A and 158B, the change coordinator 128 communicates a request for promises response to the partial replica 140 and the set of full replicas 130. At steps 160A and 160B, the partial replica 140 and at least 2 of 3 full replicas communicate promise response to the change coordinator 128. At steps 162, the change coordinator 128 can communicate an acknowledgement response to the client 110. At steps 164A and 164B, the change coordinator 128 can communicate instructions to the partial replica 140 and the set of full replica 130 to commit the data. At step 166, a last full replica of the set of full replicas 130 can communicate a promise response. At step 168, the change coordinator 128 can advance a forget sequence number. At block 170, based on receiving promise responses from the set of full replicas, the change coordinator 128 communicates a forget instruction to the partial replica to cause deletion of the of the data block.

With reference to a read request, a client transmits a read request to a full replica of the set of full replicas. The replica compares its commit LSN to the LSN of the client. If the full replica has a commit LSN greater than or equal to the LSN of the client, the full replica processes the read request and returns the data to the client. It is contemplated that when a client first mounts a volume, it will not have any LSN values for store data (e.g., slice). If the first Input/Output to a slice is a read, the client must send the read to the change coordinator with an LSN of zero. The change coordinator can then assign the read request the current committed LSN.

It is further contemplated that if a commit LSN of a replica is lower than the LSN of the client, the replica can compare its promise LSN to the LSN of the client. If the promise LSN is greater than or equal to the LSN of the client, the replica can process the read request and return the data to the client. The assumption is that the request must have committed, since the client has the LSN. It could be a corrupt client, however, so the replica must not advance its commit LSN. If the LSN of the replica is not sufficiently advanced to satisfy the read request, the replica can either fail the read request with an error which indicates the replica is behind with regards to the LSN or wait for the LSN of the replica to advance. In the first case, the client would send the read request to the change coordinator or another full replica. The change coordinator may be configured to always know the LSN state of all of the replicas. The change coordinator may also be configured to forward the read request to a replica which can satisfy the request.

Turning to FIG. 1, FIG. 1 includes the storage service 120 that further support a failure conditions logic (e.g., failure conditions logic 124) that instructs on functionality in different types of loss scenarios. By way of illustration, the storage objectives can be configured into the storage system (i.e., storage system 100) such that a loss of one or more replicas in a replica set (that still leaves a write quorum of replicas operating) does not have any effect on the ability to make forward progress. So changes can then be promised by the remaining replicas. In which case, there is no tolerance for a slow replica. For example, assuming a write quorum of three out of four replicas, a loss of one replica would result in all writes having to be promised by the three remaining replicas.

The loss of enough replicas to reduce the replica count below the write quorum but still maintaining a read quorum of replicas means that no new changes can occur until enough replicas are recovered or rebuilt to achieve a write quorum again. Reads can still continue from a remaining full replica. For example, if two out of four replicas in a set are lost, one replica must be recovered or rebuilt before writes can resume.

The loss of enough replicas to reduce the replica count below the read quorum can be a complete failure. For example, no reads or changes can occur. The replica set cannot be rebuilt, since the read quorum is missing. A read quorum of replicas must be recovered in order to establish the highest committed LSN. The replica set can then be rebuilt. For example, a failure of three out of four nodes in a replica set means that the replica set has completely failed. Note that if there is a mechanism to guarantee that the highest possible committed LSN is known, the replica set can be rebuilt from a single full replica which has promised that LSN.

The failure conditions operations include operations to add or remove a replica from the storage system. A new replica (e.g., new replica identifier) can be transmitted to the change coordinator with an updated metadata version. The change coordinator can adjust a list of replicas receiving changes based on the new replica. If a new, full replica is added, the change coordinator can also communicate instructions for the new full replica to rebuild and provide the source replica for a rebuild operation. The change coordinator may not be responsible for instructing a removed replica to delete data. The change coordinator can be configured to stop the replica changes. The metadata server may be configured to instruct replicas to remove data instances as part of its garbage collection and replication logic.

The failure conditions operations include operations for handing off a change coordinator. This type of hand-off may be referred to as a "positive hand-off" from a current change coordinator to a new change coordinator. The metadata server transmits a request to the current change coordinator to request the current change coordinator to stop accepting new changes and to return the LSN of the last change the current change coordinator transmitted. When the current change coordinator acknowledges that the current change coordinator has stopped and returns the last LSN that the current change coordinator sent, the current change coordinator becomes the old change coordinator. The metadata server then updates the replica set and transmits the replica set to the new change coordinator. Since the replica set changed, the metadata version is advanced. The epoch can be configured to not be changed, since the LSN stream is being continued. The new change coordinator determines the LSN that can be used for new changes and which nodes are hosting the replicas. The replicas can be configured to continue to promise to the old change coordinator up to and including the last LSN the old change coordinator sent. The old change coordinator can acknowledge these changes to the client. The replicas will promise all new changes to the new change coordinator, and the new change coordinator will acknowledge those changes to the client.

The failure conditions operations can further include operations for rolling back an LSN. Rolling back an LSN operations can be implemented when an error is encountered on a request, and the change coordinator wants to abort at a given LSN. The change coordinator transmits a request to the metadata server asking for the current LSN stream to be sealed at a given LSN (one lower than the LSN to abort). The metadata server will acknowledge the seal at LSN and advance the epoch. The change coordinator then relays the seal LSN and new epoch to the replicas. It is contemplated that metadata version can be reset to one when the epoch advances.

The failure conditions operations include operations for reassigning a change coordinator. Reassigning a change coordinator operations can be implemented when the old change coordinator has failed (i.e., "negative hand-off"). In this case, the metadata server can be configured to advance the epoch and transmit a message to all replicas telling the replicas of the new epoch and further requesting the replicas to report their highest promised LSN. The metadata server can be configured to retrieve a response from at least a read quorum set of replicas in order to guarantee progress has been stopped on the old LSN stream. From the responses, the metadata server can determine that all changes have stopped and it can determine the seal LSN for the old LSN stream. The metadata server then transmits the replica information and seal LSN to the new change coordinator. The new change coordinator relays the seal LSN to the replicas and takes over as the change coordinator. It is contemplated that the metadata version can be reset to one when the epoch advances.

The failure conditions operations include also include operations for cascading failures in the storage system. With the first three recovery mechanisms described above, the change coordinator is accessible and properly operational. The last recovery mechanism assumes a failed change coordinator. Any failure in the first three mechanisms can always degrade to the last mechanism. The last mechanism requires only the metadata server and a read quorum set of replicas from the old configuration. If the metadata server is not fully operational, this could be an indication of larger problems in the storage system. If a read quorum set of replicas is missing, the slice may not be recoverable. It is contemplated that the one exception can be that if there exists some other way to know the highest committed LSN and there exists at least one replica with a promise LSN of that value or higher. The metadata server can recover from any type of failure, provided the metadata server is operational, the metadata server can determine the highest possible committed LSN, and the metadata server has a replica with the data up to and including that LSN.

FIG. 1 includes the storage service 120 that further supports a rebuilding logic (e.g., rebuilding logic 126) that instructs on functionality for rebuilding replicas in the storage system. The rebuilding operations include operations for rebuilding a partial replica and a change coordinator in the storage system. Rebuilding a partial replica can include operations for adding a new, partial replica to the replica set, which can be configured to advance the metadata version. The partial replica will then receive all changes. If the forget LSN is one lower than the first change transmitted to the partial replica, the partial replica can immediately start promising changes. It is possible, however, that a full replica was already missing when the partial replica failed. In that case, the forget LSN may not be for the change just prior to the new change. Which in turn means, there is little value in creating the new, partial replica. In this regard, the missing full replica can be replaced first so that the forget LSN can advance. Rebuilding the change coordinator may not require any data to be copied. The new change coordinator simply needs to know the state of the replicas.

The rebuilding operations can further include operations for rebuilding a full replica in the storage system. Rebuilding operations for a full replica can divided into three phases. The first phase can be to add the new replica to the replica set, which can be configured to advance the metadata version. At this point, the full replica can be configured to start to receiving changes. The full replica can record these changes, but the full replica may be configured to not actually apply changes until the full replica has rebuilt the older data. The second phase can be the rebuilding process. The replica can read all of the data starting with the oldest version and working towards the latest version. This ensures that all snapshot/version information is maintained. The third and last phase can include applying all of the changes the replica has been storing to the data it rebuilt from another replica. After this is done, the replica is fully up to date and the replica can promise LSNs as it normally would.

The rebuilding logic can be based on several defined details including terms for referring to entities or operations of the replication logic and assumptions for the entities and operations, as discussed below. For example, a rebuilding can refer to a replica which is populating changes into itself. An existing node can refer to a replica which can be the source for this population. Version can refer to a storage service version, commonly thought of as a single snapshot. Versions have increasing identifiers over time. Target Sequence can refer to the epoch and sequence identifier to rebuild to. Conceptually, rebuilding means taking a consistent image of a slice including all prior versions and shipping to another node, retaining consistency. In practice, this needs to be packetized and driven through a pull-style interface to reduce interference with other traffic and enable us to build a quality of service (QoS) scheme for it.

Rebuild operations can be performed up to committed data and not promised data. The window between the commit sequence and promised sequence is not quorum committed and can be aborted via an epoch bump. When rebuilding via an interface which describes in-place data, the distinction between committed and promised is lost, and the storage system operates to rebuild a node to a promised sequence which could then be subject to an epoch bump triggering abort. In addition, rebuilding operation can support rebuilding forward in time, which is a slightly different operation from rebuilding to a point in the past. When moving forward through time, we can describe what has changed between two versions, replicate those changes, and be consistent. When going backwards through time, the absence of a change between two versions becomes meaningful, because the rebuilding node can be configured to ensure that the data has not been changed between versions. This might mean copying unchanged data from a previous version into the next version.

Rebuilding operations for partial replica can be configured in the same manner as a full replica. When rebuilding from a full replica, changes can be described about what data have changed between versions and a mechanism for describing those changes. There is no reason why the same interface would not cleanly map to a partial replica. The only additional requirement when populating from a partial replica is that since the existing node does not retain data to the beginning of time, the rebuilding node must apply to a starting point equal to or newer in time than the existing partial replica node's initial sequence.

The rebuilding operations can include a basic sequence of operations for rebuilding a partial replica in the storage system. The basic sequence of operations can include a capture target sequence and an initial sequence. The capture target sequence can include the change coordinator configured to communicate to the rebuilding node that the rebuilding node should rebuild, specifying a target sequence to rebuild to and an existing node to populate from. The change coordinator can be configured to ensure that any sequences greater than the target sequence are supplied to the rebuilding node from the coordinator. This sequence represents the hand-off point between the data delivered from an existing node and the data delivered from the coordinator. The initial sequence can include a rebuilding node that already has data for a slice, such that the rebuilding node autonomously determines the sequences the rebuilding node can ignore during population. This is true whether the existing node is partial replica or full replica.

The basic sequence of operations further include operations to verify that an existing node has target sequence. Noting in particular that the existing node could have committed the target sequence, prior to commencing any transfers the rebuilding node must verify the existing node does have the slice at the target sequence. To implement this, the rebuilding node can be configured to query the existing node for the currently committed epoch and sequence of the rebuilding node, as well as its initial epoch and sequence. For a full replica, the initial epoch and sequence is zero. The rebuilding node can then compare that the existing node's committed sequence is equal to or greater than the target sequence, and that the existing node's initial sequence is less than or equal to the rebuilding node's committed sequence.

Although an epoch bump can cause an existing node to abort operations, such aborts are limited to data that has been promised but not committed which are explicitly outside the scope of rebuild. In theory an epoch change while rebuilding should not affect the correctness of the operation. The complexity with continuing in the face of an epoch bump is that the rebuilding node is conceptually acting under the direction of an old coordinator and is depending on that coordinator to send it all operations in the process. Completing would require operations from multiple coordinators, noting the sequence, applying operations from the new coordinator beyond the unseal sequence, commencing promising on a new epoch, etc. This complexity does not seem warranted. As such, the system will treat epoch bump as a fatal condition causing rebuild to be restarted.

The rebuilding operations include operations for durably marking a slice as rebuilding. Prior to modifying any on disk state, the rebuilding node can be configured to indicate that the slice is being changed and no longer conforms to any specific sequence. Having made this indication, the node can be configured to promise to never utilize a slice for user requests until rebuild is complete, regardless of reboots or network configuration changes. This may be the first operation that the node has ever performed on the slice in case of a new replica.

The rebuilding node can also be configured to enumerate versions on the existing node. The output to this should include the versions known to the existing node, including their current client (mount) identifier, as well as the epoch and sequence at which they were created, and the number of extents which have changed between this version and the previous version. The creation epoch and sequence can be used to avoid any further operations on versions where the rebuilding node has an initial sequence equal to or greater than this value. The absence of a version, however, can be meaningful as a rebuilding node may have this version and need to delete it in response. There is no mechanism to filter these operations, although since version identifiers are increasing over time, this operates like a linear merge. It is contemplated that the version enumerate operation include an indication of which version is currently writable. Note that this is not meaningful in the context of rebuild, however. Once a rebuild has applied all versions in the list, it can be left with the most recent version as implicitly the writable version, although subsequent operations may move the writable version forward.

The rebuilding operations can further include operations that support loop over versions and enumeration of extents. It is contemplated that the storage system can be configured to process versions in order. For each version requiring rebuilding, query the extent map of what has changed between this version and its predecessor. The number of such extents was known at the time of the version enumerate, but may have changed in the meantime by a delete of a prior snapshot. Any extent enumerate request must indicate the number of extents to return (which itself is a function of buffer size), so if the request fails indicating more data, the rebuilding node can re-query the versions specifying this version as the beginning of the enumerate to capture the current number of extents. In addition, where a prior version was deleted and the number of extents increased, it is expected that this deletion will be recorded as a sequence between the target sequence and the current quorum committed sequence, so this delete can be reapplied once rebuild is complete.

The rebuilding operations include operations to rebuild reads in the storage system. By way of illustration, although similar to a user read, a rebuild read can differ in two important ways. Firstly, client (mount) verification can be configured to be suppressed. Second, returned data can be configured to be limited to committed data only. Subject to these two caveats, the process to read from a single extent on an existing version is similar to a regular user read. Minimally these differences could be indicated in a flag in the read request operation. It is contemplated that that if a version delete occurs while reading extent data, it is possible that a read can fail indicating the version is gone. A rebuilding node can immediately delete this version, or simply skip further reads and move to the next version. As above, the deletion request should be recorded and will be processed normally before rebuild is complete.

The rebuilding operations include operations for completing a version in the storage system. In particular, having read all data in a version, a rebuilding replica can be configured to request the current committed epoch and sequence applied to a slice. This may be greater than the target sequence, indicating that new changes have been committed against a version while the rebuild is in flight. The significance of this value is that the rebuilding node may have a set of changes that are internally inconsistent between the target sequence and the most recently committed sequence. Taking a simple example, a new extent may be modified that was not captured in the extent query, and that may span an existing extent, so the rebuilding replica is left with an incomplete portion of a new user write. This state is not a state the user would ever observe. The version is not consistent until all sequences up to this most recently committed sequence have been processed. It is contemplated that a writable version is not special in this scheme. The initial rebuild may be under-inclusive and this is resolved once new operations are processed, both for snapshot versions, versions that were writable at the beginning of the sequence, versions writable by the end of the sequence, and even versions which come into existence after the initial version query. The client (mount) token of the version needs to be updated at some point in this sequence (doesn't matter when.) This can be set to the same client token as the version enumerate. Any changes since that time will be reapplied later.

The rebuilding operations include operations for processing operations between a capture target maximum included sequence in the storage system. By way of illustration, because state is now inconsistent, the inconsistency is resolved by reapplying changes that occurred between the target sequence and the highest committed sequence observed. Once all these changes have been reapplied, the slice should be consistent up to the highest committed sequence. Although generally this amounts to processing operations as usual, there are some different behaviors necessitated by race conditions that can occur during this processing.

Firstly, a request could be made to create a version which already exists. This can occur because the version was created after the target sequence but before the version enumerate was processed. This condition could be detected because the enumerate records the created sequence of a version. Regardless, this condition is benign and should be ignored. Secondly, a request can be made to delete a version which has already been deleted, for the same reason as above. This is benign and should be ignored. Thirdly, a request can be made to write to a version which has become read only. The initial version enumerate implicitly divulges the writable version at that time, but a write may occur between the target sequence and the committed sequence when the version enumerate occurs. However, this implies that the write must have been present in the version when its extents were processed, so the write can be ignored. However, in general operations can be blindly reapplied, even if destructive. The storage system may overwrite "new" data with "old" data before rewriting it with "new" data again. Once operations are applied up to the maximum included sequence, the slice can be switched out of the rebuilding state and is now regarded as committed to the maximum included commit value. At this point operations can be promised to this value. Accepting new operations and commence promising can begin. Having ended the rebuilding phase, new operations can be processed as they otherwise would, and the special considerations for version creation and deletion no longer apply.

Aspects of the technical solution of this disclosure have been described with reference to several inventive features and advantages associated with improving the limited capacity of conventional systems to meet a combined set of storage requirements (including storage objectives based on: loss of a replica, degraded performance of a replica, storage efficiency, and a predefined number of durable copies) by providing temporary storage for data that has to be durably stored based on a replica set that includes a partial replica and a set of full replicas in a computing environment. In particular, the partial replica of the replica set temporarily and durably stores data but does not persist the data when the set of full replicas have communicated promise responses for the data. The technical solution described supports durability and latency objectives in a distributed computing system based on continuously (without conventional interruptions) performing replica set operations, while having in-place reads and writes for disk space workloads. Overall, the a practical application of aspects of the technical solution described results in improvements based on less CPU computation, smaller memory requirements, and increased flexibility in storage systems.

Figure 3:
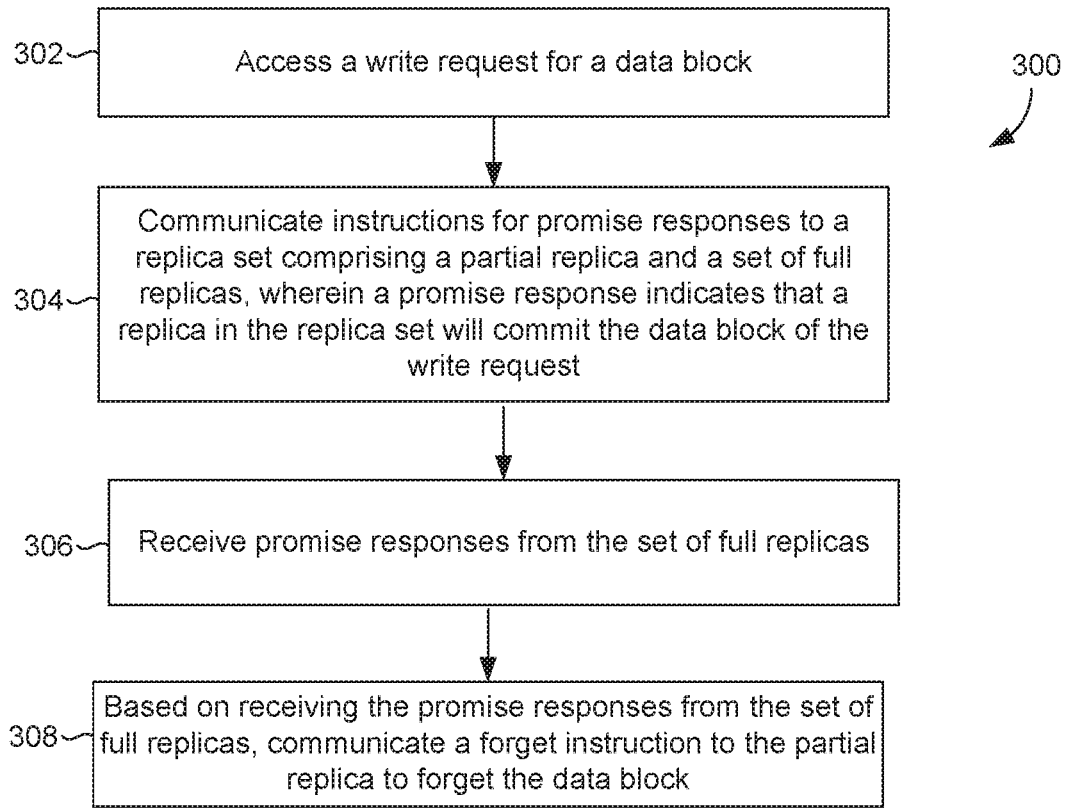
FIG. 3 provides a first example method of providing replica set operations in accordance with aspects of the technology described herein.
Figure 4:
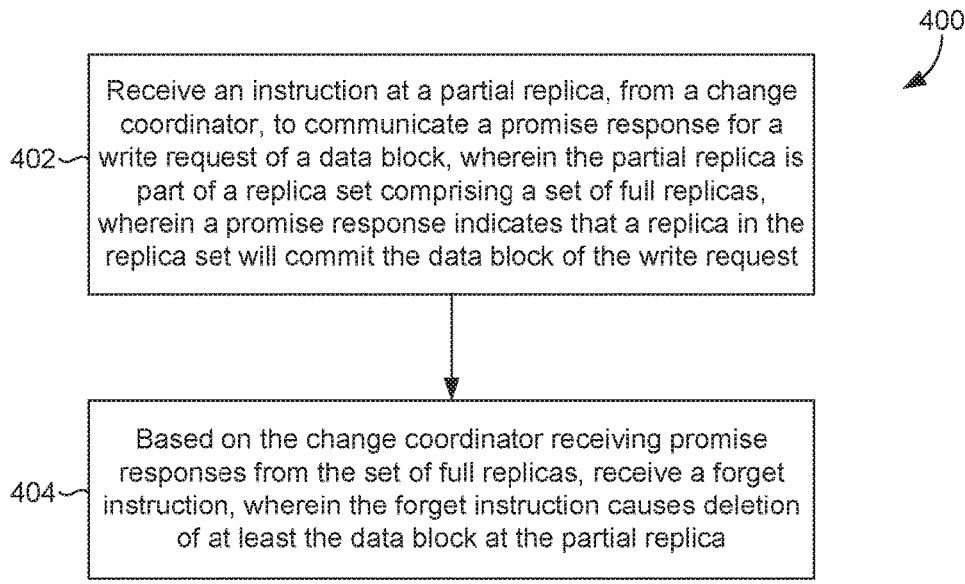
FIG. 4 provides a second example method of providing replica set, in accordance with aspects of the technology described herein.
Figure 5:
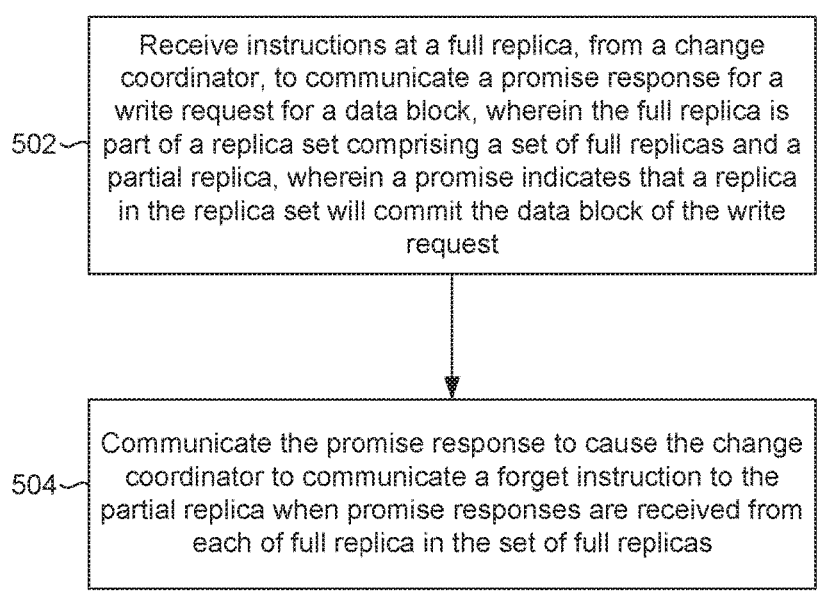
FIG. 5 provides a third example method of providing replica set operations, in accordance with aspects of the technology described herein.

Example Methods for Providing Storage Management Based on Replication Set Operations With reference to FIGS. 3, 4 and 5, flow diagrams are provided illustrating methods for providing replication set operations a storage system. The methods may be performed using the storage system environment described herein. In embodiments, one or more computer storage media having computer-executable instructions embodied thereon that, when executed, by one or more processors can cause the one or more processors to perform the methods in the storage system.

Turning to FIG. 3, a flow diagram is provided that illustrates a method 300 for providing replica set operations. Initially, at block 302, a write request for a data block is accessed. At block 304, instructions for promise responses are communicated to a replica set comprising a partial replica and a set of full replicas. A promise response indicates that a replica in the replica set will commit the data block of the write request. At block 306, promise responses are received from the set of full replicas. At block 308, based on receiving the promise responses from the set of full replica, a forget instruction is communicated to the partial replica to forget (e.g., delete) the data block of the write request.

Turning to FIG. 4, a flow diagram is provided that illustrates a method 400 providing replica set operations. Initially, at block 402, an instruction is received at a partial replica, from a change coordinator, to communicate a promise response for a write request of a data block. The partial replica is part of a replica set comprising a set of full replicas. A promise response indicates that a replica in the replica set will commit the data block of the write request. At block 404, based on the change coordinator receiving promise responses from the set of full replicas, a forget instruction is received at the partial replica. The forget instruction causes deletion of at least the data block at the partial replica.

Turning to FIG. 5, a flow diagram is provided that illustrates a method 500 providing replica set operations. Initially, at block 502, instructions are received at a full replica, from a change coordinator, to communicate a promise response for a write request for a data block. The full replica is part of a replica set comprising a set of full replicas and a partial replica. A promise indicates that a replica in the replica set will commit the data block of the write request. At block 504, the promise response is communicated to cause the change coordinator to communicate a forget instruction to the partial replica when promise responses are received from each of full replica in the set of full replicas.

Example Storage System Environment

With reference to the storage system environment 600 ("storage system"), which includes a storage system for performing embodiments described herein that support the functionality of the technical solution. The storage system includes distributed components of the storage system that are communicatively implemented in combination with other integrated components that implement aspects of the technical solution. The storage system environment 600 refers to the hardware architecture and software framework that support the functionality of the technical solution.

At a high level, the storage system provides support for a block store and blob storage in a distributed computing system. With initial reference to the block store, the block store operates based on disk semantics for support high speed disk workloads in a durable manner. In particular, the block store operates based on an interface that allows reads and writes of data at a predefined aligned offset (e.g., 4K) that are multiples of the predefined aligned offset. The block store includes underlying components that implement the interface to limit overhead while providing durability writes in a distributed computing environment.

The storage system can also be update-in-place distributed computing storage, where in contrast to append only storage systems, here, when data changes, the data is updated where the data resides. Update in-place supports peak performance compared to append-only, in that, the data is written to the same storage location each time. For example, for targeting disk space workload that heavily overwrites data results in garbage collection operations when the data is written as append-only. The garbage collection operations also take time and resources. The storage system 600 can support a configuration for durability, performance degradation tolerance, loss tolerance, and storage efficiency.

Figure 6:
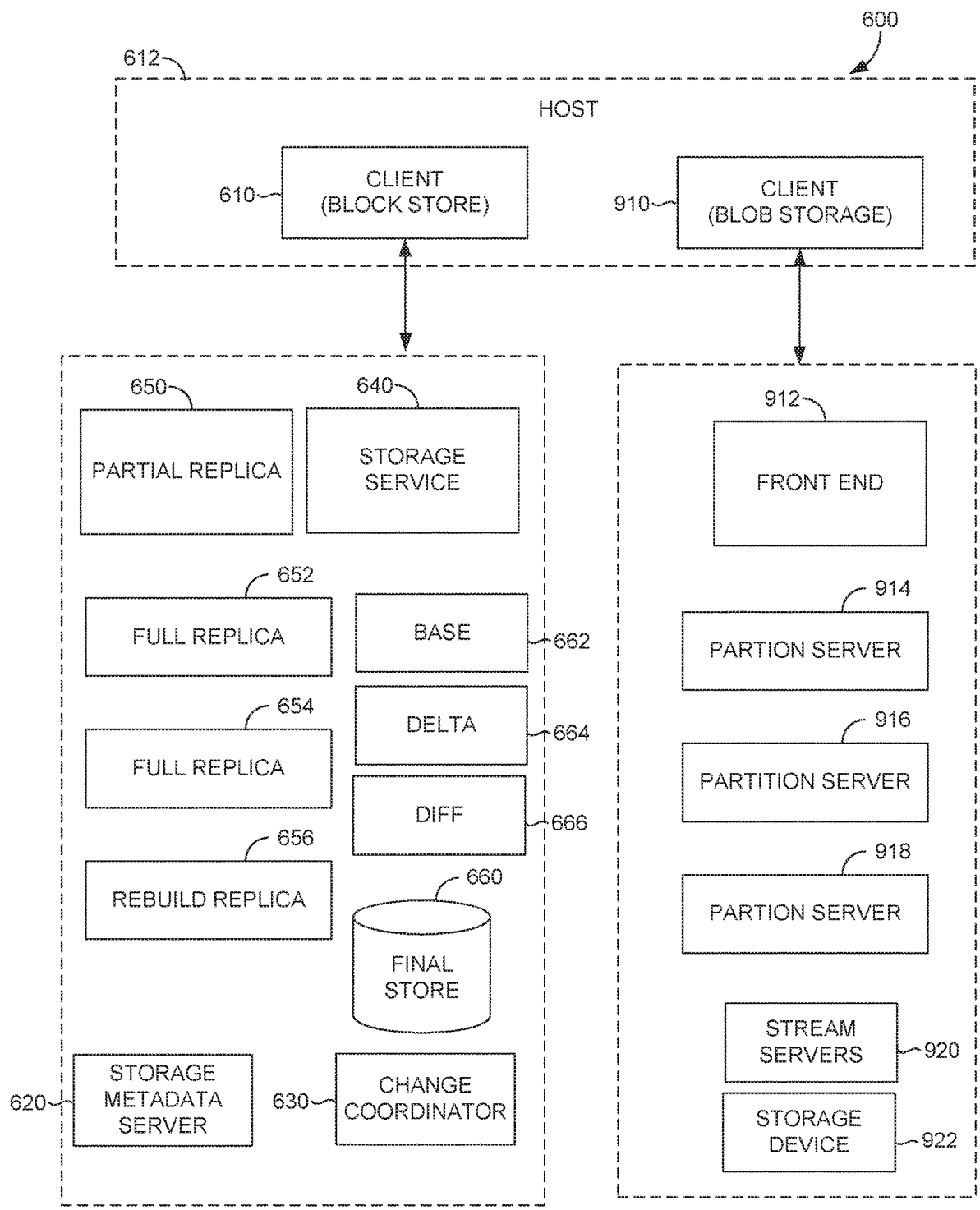
FIG. 6 provides a block diagram of an example storage system environment suitable for use in implementing aspects of the technology described herein.

With continued reference to FIG. 6, FIG. 6 shows a high level architecture file system environment 600 having components in accordance with implementations of the present disclosure. It should be understood that the arrangements described herein are set forth only as examples and other arrangements, instead of those shown, are contemplated. Among other components not shown, the storage system includes storage system engine having virtual disk client 610 (e.g., virtual disk client), host 612, storage metadata server 620, change coordinator 630, storage service 640, partial replica 650, full replica 652, full replica 654, rebuild replica 656, final store 660, base 662, delta, 664, and diff 666.

In operation, by way of example, the a client (e.g., client 610) can run on a host operating system (OS) on a host (e.g., host 612). The client can expose a disk device to a virtual machine (VM) on the host. A virtual disk can be mounted on the VM based on a storage metadata server (e.g., storage metadata server 620) corresponding to the virtual disk. The virtual disk can be divided into virtual disk storage partition (e.g., slices). The storage metadata server manages the slices for the virtual disk (e.g., a list containing information about the slices and the list of nodes containing the slices and snapshot revision levels for each virtual disk and access to the virtual disk (e.g., mounting operations). The storage metadata server can be a replicated state machine.

The client communicates with the storage metadata server and retrieves information (e.g., devices and device locations) for performing storage operations. The storage metadata server manages configurations, access, and communications. A storage service (e.g., storage service 640) is distributed across storage nodes as a kernel component that handles data storage including a final store (e.g., final store 660) for long term data storage, cached delta list having durably committed data that can be rebuilt when recovering from a failure, durable staging area for temporarily holding data before the data is written to the final store.

The storage system supports different types of disks (e.g., base 662, delta 664, and differencing "diff" disk 666). The block store include virtual hard disk (e.g., VHD import and export), and storage configurations (e.g., configurable replica sets and write quorum count). For example, three durable copies can a configuration for acknowledging write requests for blocks of data. It is contemplated that the storage system can allow for less durable copies if a client system can handle fault tolerance. The change coordinator processes a write request (e.g., performs a write operation for a range of blocks) and stores data of the write request in the staging area. The data is stored (i.e., committed) to the staging area with metadata for the write request committed to both the durable and cached delta list. The change coordinate determines that the data and metadata are durably stored and communicates a positive acknowledgement of the write request. The block store service can batch writes to the final store as necessary for optimal performance. De-staging of data to the final store may be performed asynchronously from the client's write path. When the change coordinator 640 processes a read request (e.g., performs a read operation for a range of blocks) the storage service access the cached delta first, and if the most recent data are in the staging are, then it satisfies the read from the staging area, otherwise the read request is forward to the final store 660.

With continued reference to FIG. 6, by way of background, the storage system 600 can include features and functionality that support blob storage. In particular, a front-end 912, partition servers (partition server 914, partition server 916, partition server 918), stream servers 920, and storage device 930 support blob storage operations. A detailed discussion of a suitable architecture of the distributed storage system for performing embodiments described herein is further described in U.S. application Ser. No. 14/569,582, filed Dec. 12, 2014, and entitled "MULTIPLE TRANSACTION LOGS IN A DISTRIBUTED STORAGE SYSTEM," which is incorporated herein, by reference, in its entirety. At a high level, the blob storage operates as a distributed file system which manages files called streams and blocks called extents. Streams are ordered lists of extents and extents are large storage chunks. The system stream servers stores data and ensures data durability through replication or erasure coding. The partition servers operate to store data on top of the stream layer and manages high level abstractions, such as, Blobs, Tables, Queues, and Disks. The blob storage can provide a namespace and stores data by partitioning all of the data objects within a storage cluster. The front-end can consist of a set of stateless server that take incoming requests.

Example Distributed Computing Environment

Figure 7:
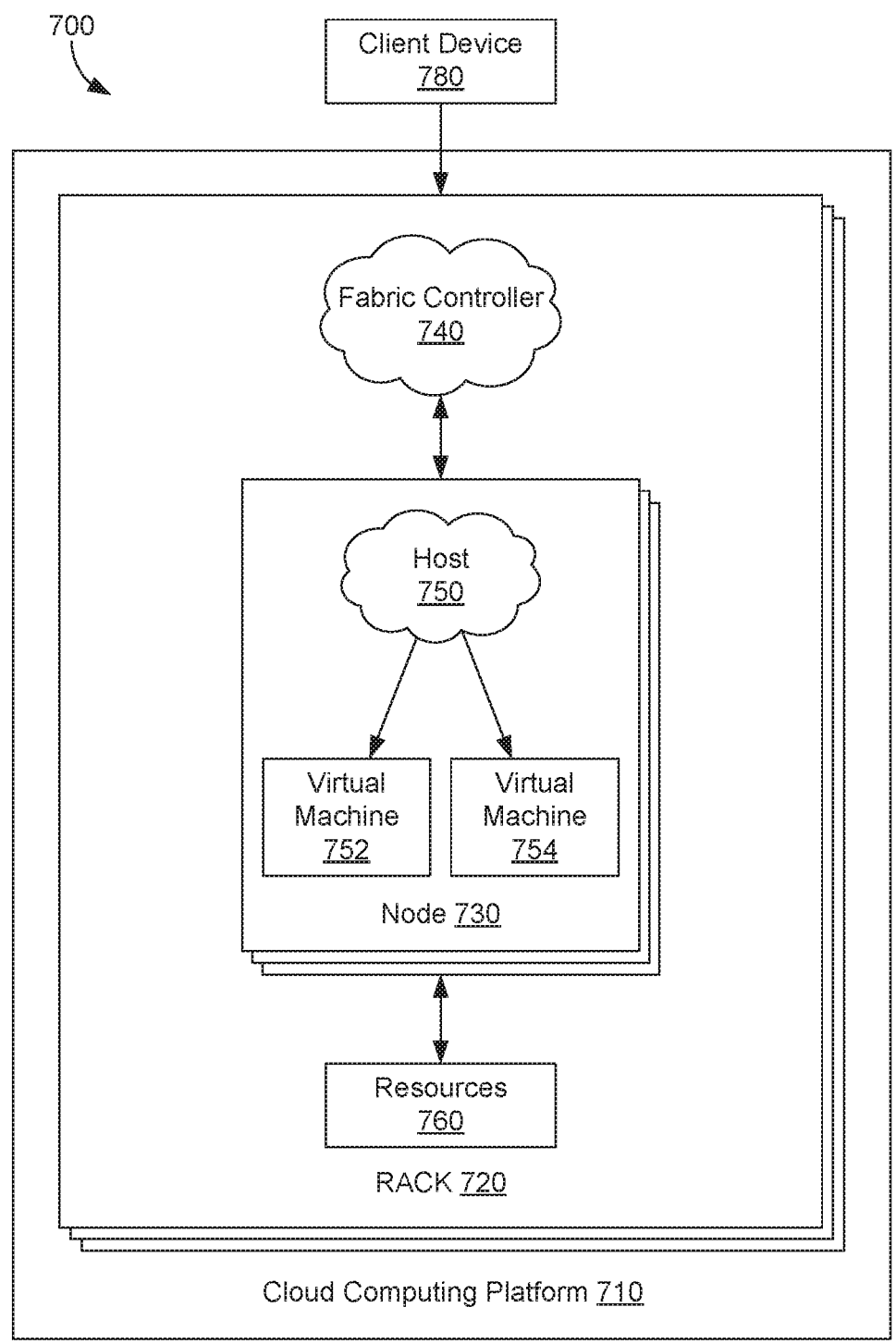
FIG. 7 provides a block diagram of an example distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Operating Environment

Figure 8:
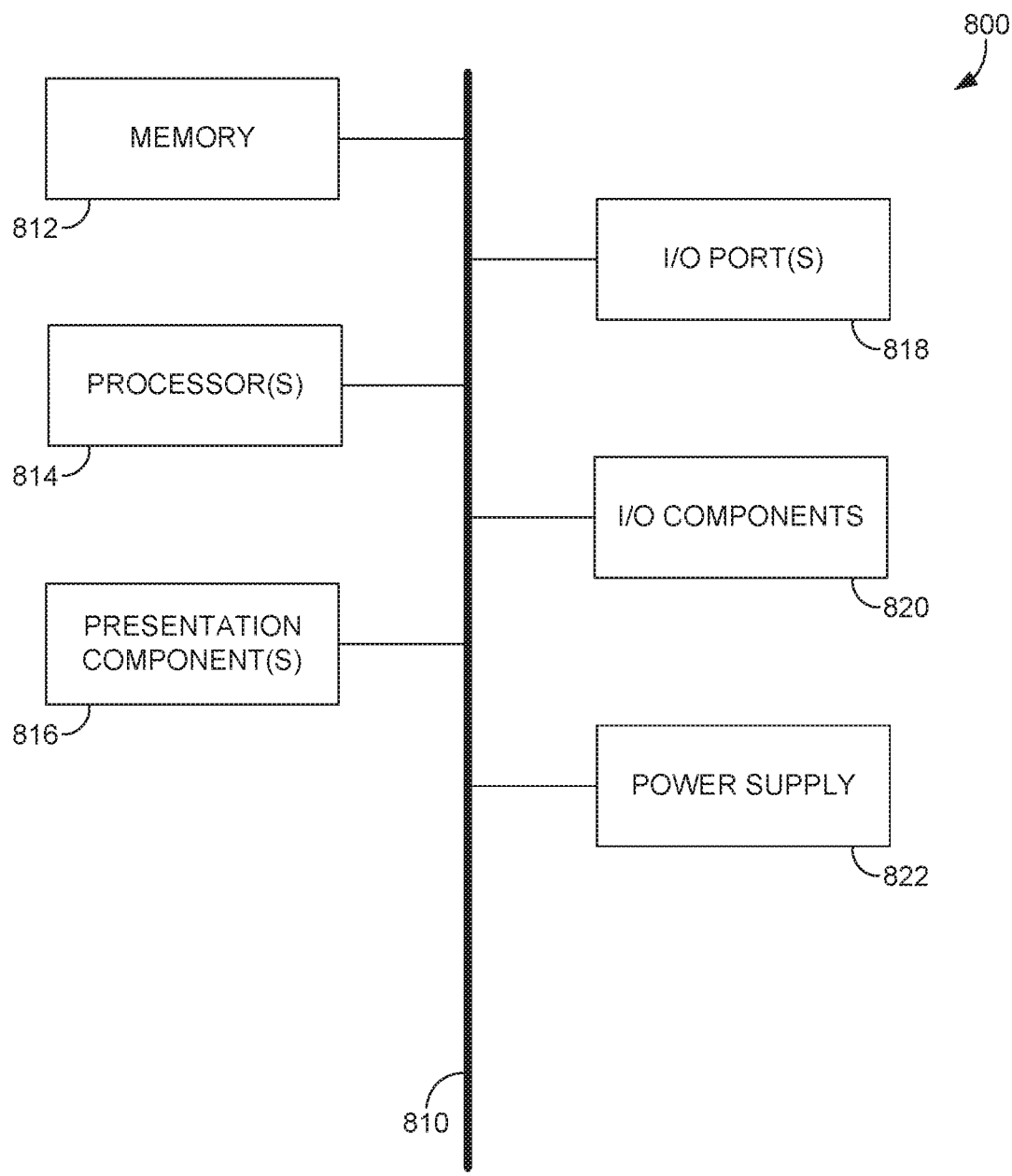
FIG. 8 is a block diagram of an example computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
   one or more computer processors; and
   computer memory storing computer-useable instructions that, when used by the one or more computer processors, cause the one or more computer processors to perform operations comprising:
   accessing a write request associated with a data block;
   communicating instructions for promise responses to a replica set comprising a partial replica and a set of full replicas, wherein a promise response indicates that a replica in the replica set will commit the data block of the write request;
   receiving promise responses from the set of full replicas; and
   based on receiving the promise responses from the set of full replicas, communicating a forget instruction to the partial replica to cause deletion of the data block.

2. The system of claim 1, wherein the replica set comprises the partial replica and the set of full replicas to support temporarily committing data on the partial replica, and based on receiving promise responses from the set of full replicas causing deletion of the data block based on communicating forget instructions.

3. The system of claim 1, further comprising communicating an instruction to the replica set to commit the data block, wherein a full replica in the set of full replicas stores at least data for all changes including a change that has been promised, the change associated with the write request, and wherein the partial replica only temporarily stores data and deletes data based on forget instructions.

4. The system of claim 1, wherein the operations further comprise:
   tracking a current sequence number for a change for write operations and read operations, a current sequence number for a write operation corresponding a log sequence number assigned to the write operation, and a current sequence number for a read operation corresponding to a minimum log sequence number needed to satisfy the read operation;

tracking a commit sequence number corresponding to the highest log sequence number that has been promised by a quorum of the replica set; and tracking a forget sequence number corresponding to a highest log sequence number that has been promised by the set of full replicas.

5. The system of claim 1, further comprising a partial replica configured to:

receive an instruction from a change coordinator to communicate a promise response for the write request of the data block;

based on the change coordinator receiving the promise responses from the set of full replicas, receive the forget instruction; and based on receiving the forget instruction, delete at least the data block.

6. The system of claim 1, further comprising a full replica in the set of full replicas configured to:

receive instructions at a full replica, from a change coordinator, to communicate a promise response for the write request for the data block; and communicate the promise response to cause the change coordinator to communicate the forget instruction to the partial replica when promise responses are received from each full replica in the set of full replicas.

7. The system of claim 1, wherein the write request is associated with a block store storage system in a distributed computing system, wherein the block store supports in-place writing and reading of data for disk space workloads that overwrite data, and wherein the operations further comprise failure condition operations and rebuilding operations, and wherein the failure condition operations are configured for one or more of the following:

adding an identified first replica of the replica set from the block store storage system;

removing an identified second replica of the replica set from the block store storage system;

handing off an identified first change coordinator;

rolling back an identified sequence number; and reassigning an identified first change coordinator; and wherein the rebuilding operations are configured for one or more of the following:

rebuilding an identified first partial replica;

rebuilding an identified first full replica; and rebuilding an identified second change coordinator.

8. One or more computer-storage media having computer-executable instructions embodied thereon that, when executed by a computing system having a hardware processor and memory, cause the hardware processor to:

access a write request associated with a data block;

communicate instructions for promise responses to a replica set comprising a partial replica and a set of full replicas, wherein a promise response indicates that a replica in the replica set will commit the data block of the write request;

receive promise responses from the set of full replicas; and based on receiving the promise responses from the set of full replicas, communicate a forget instruction to the partial replica to cause deletion of the data block.

9. The media of claim 8, wherein the replica set comprises the partial replica and the set of full replicas to support temporarily committing data on the partial replica, and based on receiving promise responses from the set of full replicas causing deletion of the data block based on communicating forget instructions.

10. The media of claim 8, further comprising communicating an instruction to the replica set to commit the data block, wherein a full replica in the set of full replicas stores at least data for all changes including a change that has been promised, and wherein the partial replica only temporarily stores data and deletes data based on forget instructions.

11. The media of claim 8, wherein the instructions further comprise:

tracking a current sequence number for a change for write operations and read operations, a current sequence number for a write operation corresponding a log sequence number assigned to the write operation, and a current sequence number for a read operation corresponding to a minimum log sequence number needed to satisfy the read operation;

tracking a commit sequence number corresponding to the highest log sequence number that has been promised by a quorum of the replica set; and tracking a forget sequence number corresponding to a highest log sequence number that has been promised by the set of full replicas.

12. The media of claim 8, wherein the instructions further comprise:

receiving an instruction from a change coordinator to communicate a promise response for the write request of the data block;

based on the change coordinator receiving the promise responses from the set of full replicas, receiving the forget instruction; and based on receiving the forget instruction, deleting at least the data block.

13. The media of claim 8, wherein the instructions further comprise:

receiving instructions at a full replica, from a change coordinator, to communicate a promise response for the write request for the data block; and communicating the promise response to cause the change coordinator to communicate the forget instruction to the partial replica when promise responses are received from each full replica in the set of full replicas.

14. The media of claim 8, wherein the write request is associated with a block store storage system in a distributed computing system, wherein the block store supports in-place writing and reading of data for disk space workloads that overwrite data, and wherein the instructions further comprise failure condition operations and rebuilding operations, and wherein the failure condition operations are configured for one or more of the following:

adding an identified first replica of the replica set from the block store storage system;

removing an identified second replica of the replica set from the block store storage system;

handing off an identified first change coordinator;

rolling back an identified sequence number; and reassigning an identified first change coordinator; and wherein the rebuilding operations are configured for one or more of the following:

rebuilding an identified first partial replica;

rebuilding an identified first full replica; and rebuilding an identified second change coordinator.

15. A computer-implemented, the method comprising:

accessing a write request associated with a data block;

communicating instructions for promise responses to a replica set comprising a partial replica and a set of full replicas, wherein a promise response indicates that a replica in the replica set will commit the data block of the write request;

receiving promise responses from the set of full replicas; and based on receiving the promise responses from the set of full replicas, communicating a forget instruction to the partial replica to cause deletion of the data block.

16. The method of claim 15, wherein the replica set comprises the partial replica and the set of full replicas to support temporarily committing data on the partial replica, and based on receiving promise responses from the set of full replicas causing deletion of the data block based on communicating forget instructions.

17. The method of claim 15, the method further comprising:

communicating an instruction to the replica set to commit the data block, wherein a full replica in the set of full replicas stores at least data for all changes including a change that has been promised, and wherein the partial replica only temporarily stores data and deletes data based on forget instructions.

18. The method of claim 15, the method further comprising:

tracking a current sequence number for a change for write operations and read operations, a current sequence number for a write operation corresponding a log sequence number assigned to the write operation, and a current sequence number for a read operation corresponding to a minimum log sequence number needed to satisfy the read operation;

tracking a commit sequence number corresponding to the highest log sequence number that has been promised by a quorum of the replica set; and tracking a forget sequence number corresponding to a highest log sequence number that has been promised by the set of full replicas.

19. The method of claim 15, the method further comprising:

receiving an instruction from a change coordinator to communicate a promise response for the write request of the data block;

based on the change coordinator receiving the promise responses from the set of full replicas, receiving the forget instruction; and based on receiving the forget instruction, deleting at least the data block.

20. The method of claim 15, the method further comprising:

receiving instructions at a full replica, from a change coordinator, to communicate a promise response for the write request for the data block; and communicating the promise response to cause the change coordinator to communicate the forget instruction to the partial replica when promise responses are received from each full replica in the set of full replicas.

* * * * *